Oct. 22, 1968  P. E. DIEDRICH  3,406,608
CONTROL FOR VARIABLE VOLUME PUMPS AND MOTORS
Filed Feb. 18, 1966  3 Sheets-Sheet 3

INVENTOR
Paul E. Diedrich
BY
Wood, Herron & Evans
ATTORNEYS

United States Patent Office 3,406,608
Patented Oct. 22, 1968

3,406,608
CONTROL FOR VARIABLE VOLUME
PUMPS AND MOTORS
Paul E. Diedrich, Columbus, Ohio, assignor to Abex
Corporation, a corporation of Delaware
Filed Feb. 18, 1966, Ser. No. 528,517
15 Claims. (Cl. 91—368)

ABSTRACT OF THE DISCLOSURE

Servomechanism for controlling the angular position of pressure operated rotatable means such as the hanger of a variable volume pump or motor, wherein a rotational input signal cams a spool axially from a null position and thereby opens a path through which pressure fluid is applied to operate the rotatable means. Turning of the latter is fed back to the spool and rotates the spool in a direction following the rotation of the input signal. The spool is biased toward the cam, and rotation of the spool relative to the cam shifts the spool axially so that when the spool has been turned to its original position with respect to the cam it has shifted axially to its original null position and thereby closed off the flow to the pressure operated rotatable means. The servomechanism can maintain a lineal relationship between the rotary input command signal and the volume of fluid passing through a pump or motor per unit time. The cam can be coupled to the spool for establishing a positive drive thereof.

This invention relates to servomechanism for controlling the displacement or volumetric capacity of a variable volume fluid pump or motor of the type having pressure operated displacement changing means.

The servomechanism of this invention is actuated by an input or command signal from a control source, and operates on the displacement changing means of the pump or motor it controls to establish and maintain a desired volumetric capacity. The servomechanism receives a feedback signal from the controlled pump or motor indicating the actual or instantaneous position of the displacement changing means or hanger thereof. The difference between the command signal and the feedback signal, i.e. the error signal, is operative on the servomechanism to cause it to further adjust the displacement changing means to reduce the error signal substantially to zero so that the pump or motor operates at the selected displacement.

In one conventional type of variable volume pressure energy translating device which, for example, may be an axial piston hydraulic pump having rotatable volume controlling means, the volume of fluid passing through the pump in unit time can be varied by changing the angulation of a cam or swash plate against which the pistons operate, thereby changing the stroke length of the pistons in their cylinders as the cylinder barrel rotates. When the swash plate is in a centered position in which it is perpendicular to the axis of rotation of the barrel, the stroke of the pistons is substantially zero; piston displacement increases as the sine of the angle through which the cam plate is tipped from perpendicular or centered position. In so-called "single side" pumps and motors the cam plate can be tipped in only one direction from the perpendicular, and the flow can be varied from essentially zero to a maximum corresponding to maximum angulation of the cam plate, while in "cross-center" devices the cam plate can be swung from an angulated position on one side of center, through center position, to a position on the opposite side of center thereby varying the direction of flow as well as the rate of flow.

In an illustrative type of axial piston hydraulic pump the swash plate is mounted on a hanger or yoke which is journalled for rotation in trunnions provided in the pump casing. The axis about which the hanger and swash plate are swung to vary pump displacement is perpendicular to the axis of rotation of the barrel. The force required to move the swash plate increases with the angulation, and it also increases with the pressure of the fluid being delivered by the pump since the swash plate is required to withstand the reaction forces of the pressure fluid on the pistons.

Various means are known for swinging such displacement changing means to a desired angular position. The servomechanism of this invention is particularly useful with variable volume pumps and motors having displacement changing means which are operated by a linear fluid motor or pressure operated piston. As used with such fluid pressure operated displacement changing means, the servomechanism has a constant or fixed input command force characteristic. In other words, the force required to apply the input or command signal to this servovalve does not vary with the selected displacement, although the reaction force and thus the force required to move the displacement changing means or hanger of the pump or motor is a function of and varies with the delivered volume or displacement.

The servomechanism of this invention is adapted to accurately position the hanger of a pump or motor at a preselected position which may be on either side of center position. The servomechanism is actuated by a rotary input which may be manually applied, as for example by turning a control dial to a setting corresponding to a given hanger angulation. Alternatively, the rotary input to the servomechanism can be provided mechanically, for example, by rotary movement of steering apparatus.

The present servovalve includes a valve body presenting a bore in which a spool is movable both axially and rotationally. The spool forms a spool valve with a port entering the bore for controlling the application and release of pressure fluid on the pressure operated displacement changing means of the pump or motor. Axial movement of the spool relative to the port in one direction admits pressure fluid to the displacement changing means, while axial movement of the spool in the opposite direction from centered position with respect to the port releases fluid pressure on the displacement changing means.

The servovalve includes rotatable cam means which are cooperable with the spool to cam the spool axially relative to the port in response to a control signal and thereby to operate the spool valve. The spool is rotationally coupled to the displacement changing means of the pump or motor in a manner whereby the angular position of the displacement changing means is reflected or fed back to the spool and is reflected in the angular position of the spool relative to the cam means. The spool is axially movable relative to the coupling means so that it can move axially with respect to the port in the bore. Spring means yieldably bias the spool toward the cam so that engagement is constantly maintained between the cam means and the spool.

One advantage of this rotary servovalve over linear types of servomechanisms for controlling hydraulic pumps or motors is the fixed straight line relationship which this servovalve maintains between the rotary input command signal and the output or displacement in terms of volume of fluid passing through the pump or motor per unit time. In other words, a given dial rotation effects a proportional angular rotation of the hanger, irrespective of the hanger position, and a proportional output volume. This is in contrast to linear types of servomechanisms in which the change of angulation of the hanger effected by a given linear input signal to the servomechanism is a variable or non-linear function dependent upon hanger position.

This servovalve fulfills the need for a simple but effective control mechanism which provides quick and accurate response of hanger position in response to an applied control signal.

The invention can best be further described with reference to the accompanying drawings in which.

For purposes of explanation the invention is described hereinafter primarily in relation to an axial piston pump of the type having a tiltable hanger for changing the displacement of the pistons, and further which is of the cross-center type wherein the cam plate can be moved from one side of center position to the other side to change direction of flow through the pump as well as the rate.

Figure 1:
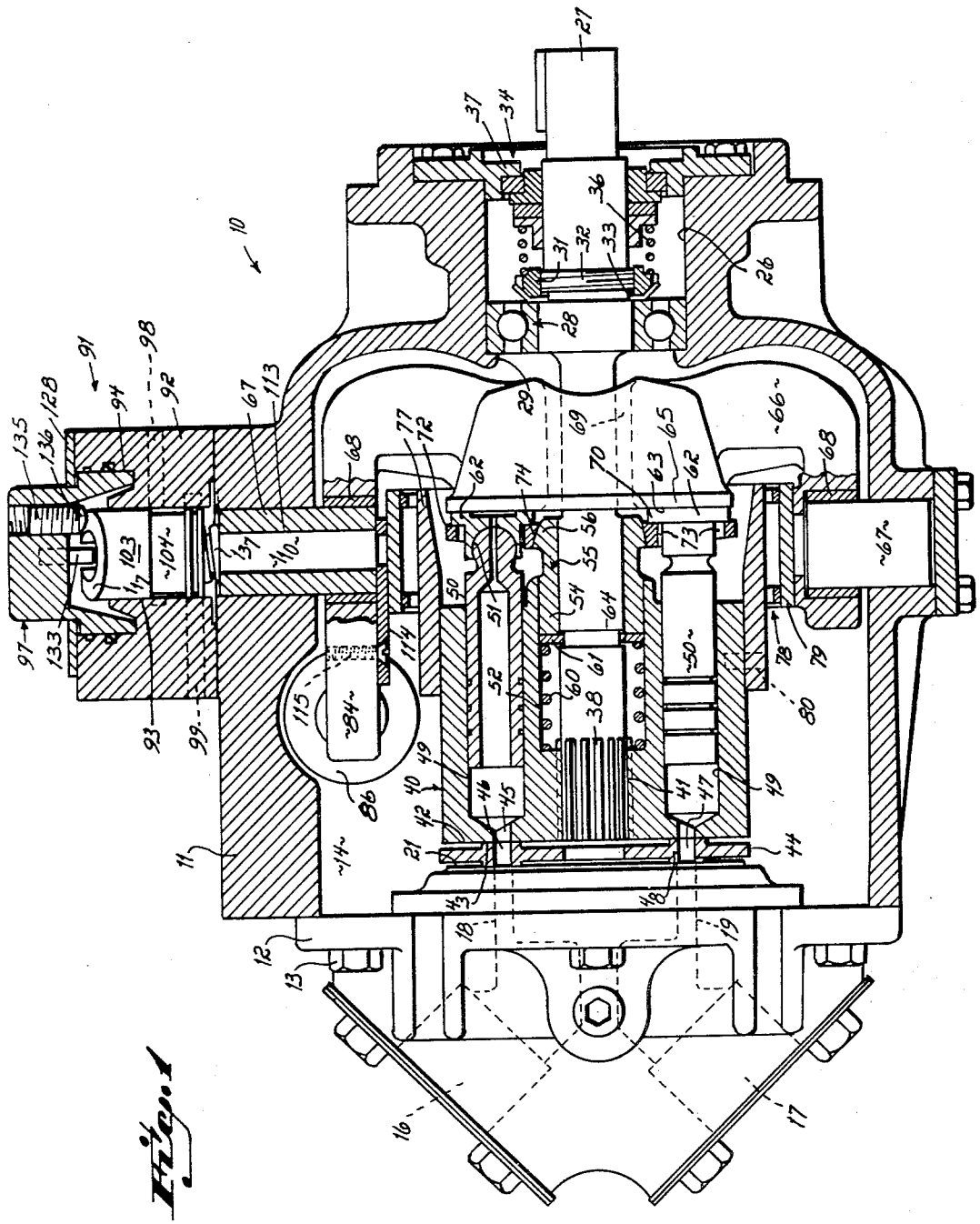
FIGURE 1 is an axial section of a hydraulic pump or motor of the axial piston type equipped with servomechanism in accordance with a preferred embodiment of this invention, and is taken on a plane including the trunnion axis.
Figure 2:
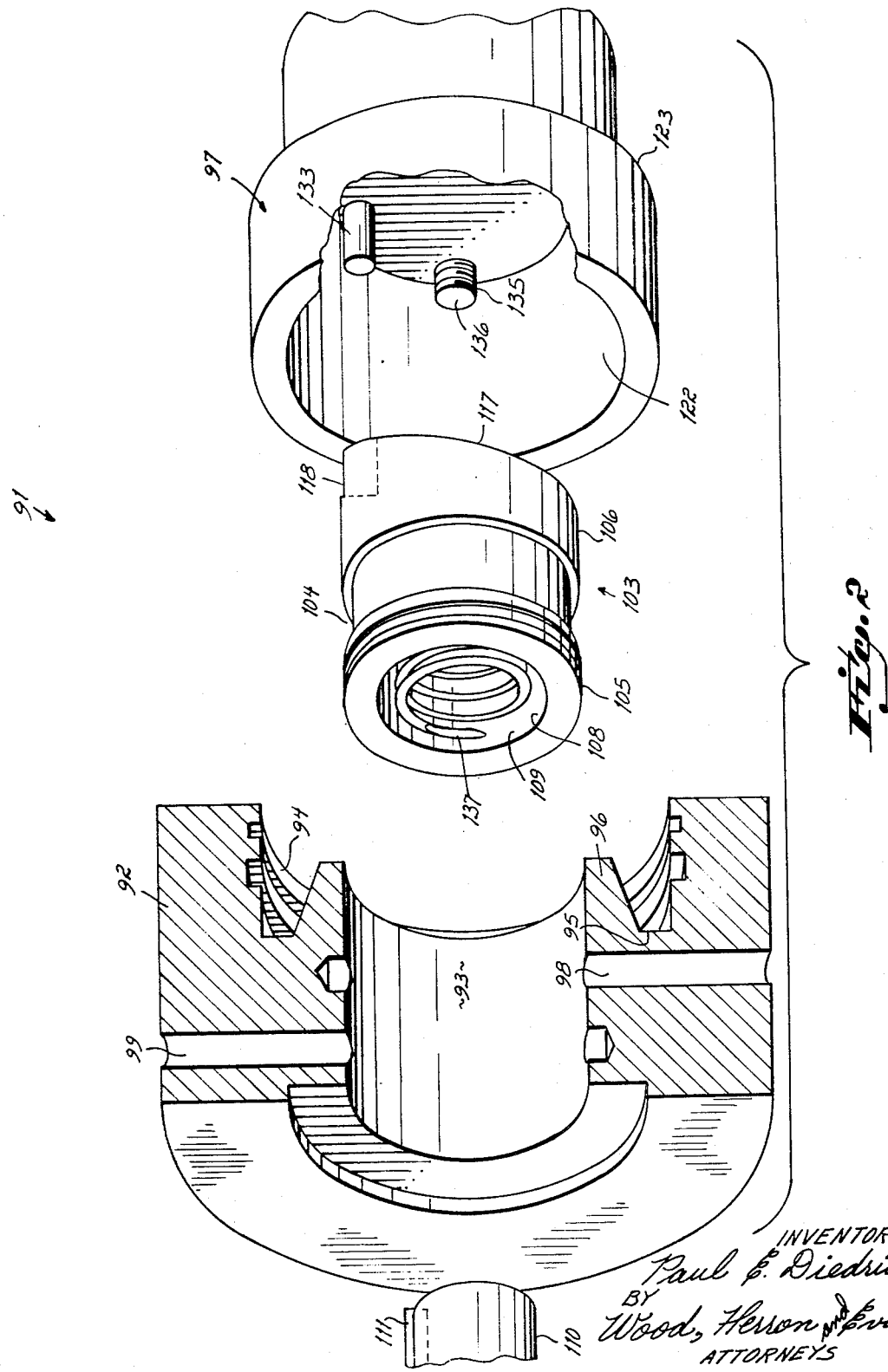
FIGURE 2 is an enlarged exploded view in perspective showing the elements comprising the servovalve of the invention.

The axial piston pump shown in FIGURE 1 has an outer casing 10 comprising a hollow, generally cylindrical body 11 and an end cap 12. The end cap 12 is secured at one end of body 11 by a suitable means such as the bolt 13. Together body 11 and end cap 12 define and enclose an internal chamber 14 in outer casing 10 within which the pumping mechanism is disposed.

End cap 12 is provided with two ports 16 and 17, one of which constitutes the fluid inlet while the other constitutes the fluid outlet. These ports 16 and 17 communicate at their inner ends with passageways or ports 18 and 19 respectively, which extend to the inner end surface 21 of cap 12. Chamber 14 communicates with a drain port (not shown) through which fluid in the chamber is returned to a fluid tank or reservoir.

A central opening 26 is formed in body 11 at the end thereof which is opposite or remote from cap 12. The operating shaft 27 of the pump extends through this opening 26 into chamber 14 toward cap 12. The outer race of an anti-friction ball bearing assembly 28 is push-fitted into opening 26 and is seated against a shoulder 29 formed therein. A lock nut 31 is threaded on shaft 27 at 32 and bears against a lock washer 33 which engages the inner race of bearing 28, thereby preventing axial movement of shaft 27 in the direction toward cap 12.

An oil seal 34 is secured around shaft 27 in the outer end of opening 26 in sealing engagement with shaft 27 to prevent the escape of fluid along the shaft. A spring 36 urges seal 34 axially into engagement with a collar 37 surrounding shaft 27 at the outer end of body opening 26, thereby urging the shaft against bearing 28.

The inner end of shaft 27 is splined as at 38, and the shaft is coupled through the splines 38 to a cylinder barrel 40. The barrel 40 has a stepped central bore 41 which is splined at its inner end, i.e., at the end adjacent the cap 12. This spline connection functions in the nature of a universal joint.

The inner end of cylinder barrel 40 forms a flat porting and bearing surface 42 which is facially engaged with a valve or port plate surface 43. A separate valve or port plate 44 of a wear resistant material may be provided between barrel 40 and end cap 12, to provide porting between the surface 43 and the ports 18 and 19. The port plate 44 shown in FIG. 1 has ports 46 and 47 which communicate between the end cap ports 18 and 19 and piston cylinder ports 45 formed in the barrel. On both faces of port plate 44 ports 46 and 47 are surrounded by raised areas or lands 48 to reduce the area of the plate subjected to pressure tending to separate it from the end cap or from the barrel.

The cylinder ports 45 extend from piston chambers or cylinders 49 formed in the cylinder barrel to the porting and bearing surface 42. As the cylinder barrel is revolved by shaft 27, these ports 45 alternately register with the ports 46 and 47 in the port plate 44 to establish communication between the chambers 49 in the barrel and the inlet and outlet ports 16 and 17 respectively in the cap. The several piston chambers 49 are disposed in parallel circular relation around the axis of the cylinder barrel, and contain reciprocable piston elements 50, the outer ends of which are formed with generally spherical heads 51.

The axial bore 41 in cylinder barrel 40 has an enlarged portion 52 outwardly of (i.e. toward opening 26) the inner splined portion thereof. In this enlarged portion 52 is received the cylindrical shank 54 of a plunger 55 the outer end 56 of which is generally sperical. The shaft 27 passes through an axial bore in the plunger 55. The plunger may be splined to the shaft in order to prevent relative rotation between them, and for convenience in mounting the plunger on the shaft. The outer surface of the plunger shank 54 may be slip-fitted in the bore 52 of the barrel.

A coil spring 60 is disposed in the enlarged barrel bore 52, encircling shaft 27, and is compressed between the end of the bore 52 and a split washer 61. This spring 60 urges piston shoes 62 to be described against the cam or swash plate 65 of the pump, and urges the barrel porting and bearing surface 42 against the valve surface 43. Split washer 61 is engaged in a groove 64 in shaft 27, the two halves of the washer being retained therein by the wall of barrel bore 52. Groove 64 limits the movement of washer 61 and plunger 55 in the direction toward valve plate 44.

The piston shoes 62 are connected with the spherical heads 51 of the several pistons 50 in a ball and socket type connection which provides universal movement between these elements whereby the bearing surfaces 63 of the shoes can constantly engage a planar bearing surface provided by the swash plate 65. The swash plate is mounted to or carried on a hanger or yoke 66.

Yoke 66 is mounted for rotation about an axis transverse to the axis of shaft 27, on trunnions 67, 67 which are secured in the body 11. Needle bearing assemblies 68, 68 may be used to journal the yoke on trunnions 67, 67. Yoke 66 and swash plate 65 have an open center area 69 through which the shaft 27 passes. Thus plate 65 can be inclined or tipped with respect to the axis of rotation of the cylinder barrel 40 so that as the latter member revolves, the pistons 50 will be reciprocated in the barrel to draw in and expel fluid through the ports 45.

To maintain the shoes 62 in sliding engagement with plate 65, the shoes are formed with shoulders 70 for engagement by a retaining disk or shoe hold-down plate 72. The hold-down plate 72 has openings 73 through which portions of the shoes 62 project for connection with the piston heads 51. The openings 73 are larger in diameter than the portions of the shoes which pass through them, to permit relative lateral movement between these elements, as caused by the angular relation of the axes about which the pistons 50 and the plate 72 revolve.

In its central portion the plate 72 is provided with a spherically shaped socket or opening 74 in which the spherical end 56 of the plunger 55 is seated. The spring 60 urges the plunger 55 into engagement with the socket 74 in the hold-down plate, and thereby urges the hold-down plate toward the swash plate 65, normally insuring constant engagement of the shoes 62 with the swash plate. The engagement of washer 61 in shaft groove 64 limits movement of the plunger away from the hold down plate 72.

A radial bearing surface for the cylinder barrel is provided by a skirt-like flange 77 which projects from the outer end of the cylinder barrel, around the plunger 55. The flange 77 is preferably pinned to the barrel as at 80. The outer surface of this flange is accurately finished to cylindrical contour and serves as the inner race for a roller bearing assembly 78, the outer race of which is press-fitted into a cylindrical surface 79 formed on the interior of the body 11. This bearing 78 supports the cylinder barrel for rotation in the body 11.

In the operation of the device as a pump, fluid is drawn into the chambers 49 in the cylinder barrel 40 from one of the ports 16 or 17, and as the barrel is rotated the angulation of the swash plate 65 forces the pistons 50 sequentially toward the valve surface 43, thereby reducing the volume of the chambers 49 so that the fluid is expelled under pressure from the chambers to the other port 17 or 16. The angulation or inclination of the swash plate 65 determines the stroke of the piston and, hence the volume of fluid passing through the pump per unit time for a given shaft speed. By swinging the swash plate from one side of perpendicular to the other the direction of flow through the pump can be reversed. If the input to the device is pressure energy rather than rotational movement, then it will operate as a motor, driving shaft 27.

Figure 4:
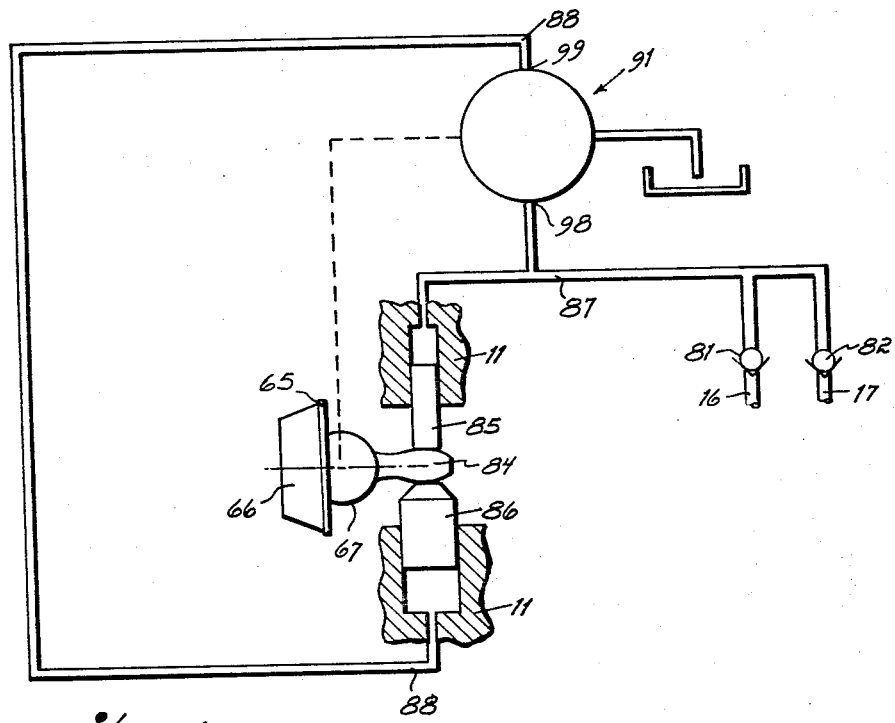
FIGURE 4 is a schematic circuit diagram showing the interconnection of the servomechanism to the hanger control pistons.

As can best be seen in FIGURE 4, the hanger or yoke 66 on which swash plate 65 is formed is positioned angularly with respect to the axis of shaft 27 by swinging movement around the trunnions 67, 67. For this purpose, yoke 66 is provided with an arm or extension 84 which is engaged on opposite sides by a biasing piston 85 and a servo operated hanger positioner piston 86. The two pistons 85 and 86 are received in aligned, opposite cylinders formed in the body 11. Fluid communication with the cylinder of biasing portion 85 is provided through a line 87. Line 87 communicates with ports 16 and 17 through check valves 81, 82 to select the higher pressure therein. Fluid communication through body 11 to the cylinder of piston 86 is provided through a line or passage 88.

As can be seen from FIGURE 4, the area of piston 86 subjected to fluid pressure in its cylinder is substantially greater, usually about twice as much, as the area of piston 85. A clockwise force or moment of a magnitude determined by the pressure in line 87 operating on the area of piston 85 will act on extension 84. With this arrangement, it is apparent that, when the pressure in line 88 is either equal to that in line 87 or is zero, a counterclockwise force or moment of a magnitude approximately twice that of the clockwise moment, or zero, respectively, is available due to the area of piston 86. Hence, a controlled torque of sufficient magnitude is available to rotate the hanger 66 about its trunnions 67 or to hold the hanger 66 in a fixed position by balancing the clockwise and counterclockwise moments.

From the foregoing it will be seen that the pump or motor device described and shown for purposes of illustration includes pressure operated movable means for changing its volumetric displacement. It will also be appreciated that the mechanism thus far described is known in the art and does not of itself comprise the present invention.

The pump or motor is provided with a servovalve designated generally at 91 which controls the magnitude of the fluid pressure applied to piston 86 and, hence, the hanger position. This valve 91 includes a body 92 having an internal bore 93, and is mounted to the body 11 of the pump by fastening means not shown so that bore 93 is aligned with the axis of trunnions 67, 67. Bore 93 opens into an enlarged re-entrant counterbore portion 94 having a flat bottom surface 95 separated from bore 93 by a skirt 96. A hat-shaped dial, control means, or knob 97 is rotatably received in the counterbore 94.

Drilled passages or ports 98 and 99 are formed in valve body 92 and enter bore 93 at axially spaced positions.

Figure 3:
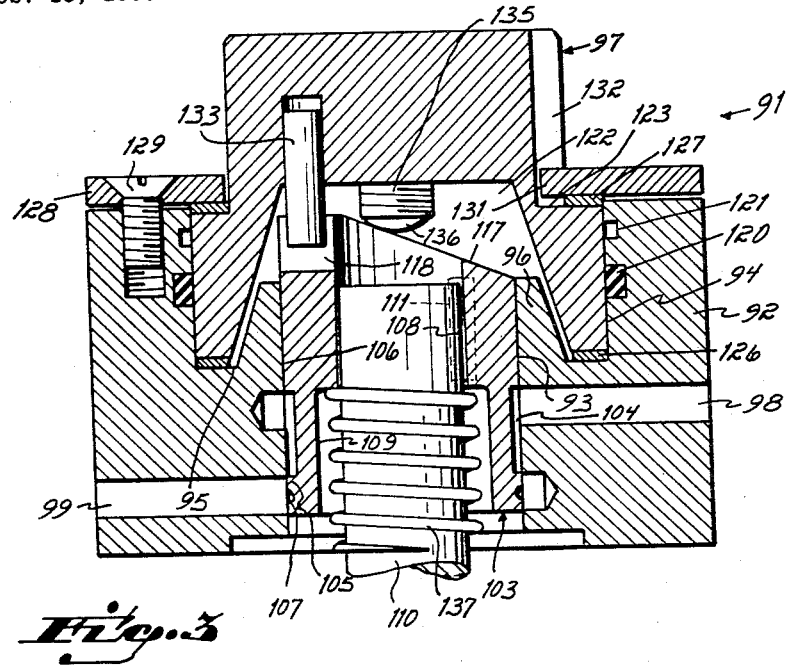
FIGURE 3 is an axial section through a preferred form of the servovalve showing the valve in closed position.

A spool valve member 103 is received in bore 93 and is movable both axially and rotatably therein. As shown in FIGURE 3, spool 103 has a peripheral groove 104 which is defined between lands 105 and 106. Land 105 is centrally grooved as at 107, and both lands 105 and 106 form seals with bore 93. Body bore 99 communicates at all times with groove 107 of land 105. The purpose of groove 107 is to permit pressure fluid from line 99 to flow around spool land 105 to the diametrically opposite side of bore 93 and to communicate with the extension of passage 99. This balances the fluid pressures, and hence the forces, on spool 103 and prevents it locking in bore 93.

The axial width of land 105 is approximately equal to the diameter of passage 99 so that when spool 103 is positioned axially in the neutral or closed position in bore 93 (shown in FIGURE 3), the edges of land 105 are approximately in line-to-line contact with the edges of passage 99. Body bore 98 communicates with spool groove 104 at all times.

Spool 103 contains a central bore 108 which is enlarged at its inner end, designatel by 109. A rotatable shaft 110 is rotationally coupled to spool 103 by a key 111. The fit of key 111 in its keyway is such that shaft 110 is coupled rotationally but not axially to spool 103, and spool 103 can move axially independently of shaft 110 while rotating therewith.

As can be seen in FIGURE 1, shaft 110 is rotationally journalled in a bore 113 in trunnion 67. This shaft 110 is connected to the extension 84 of hanger 66 by a plate 114 so that rotation of hanger 66 about the trunnions is transmitted through plate 114 to shaft 110, i.e. shaft 110 rotates with the swash plate 65. Plate 114 is fastened to arm 84 by machine screws 115 and is brazed to shaft 110.

Adjacent its outer end, spool 103 is provided with an inclined ramp or cam surface 117 which may be planar as shown in FIGURE 3. The spool is slotted at 118, in the high edge of cam surface 117.

Control means or dial 97 is sealed in the counterbore portion 94 of the body bore by an O-ring 120 to prevent fluid leakage to the atmosphere. A lubricating groove 121 is provided which may be packed with grease to facilitate turning the dial in bore portion 94 and to prevent entrance of foreign particles to the valve. Dial 97 has a truncated axial internal recess 122 and is provided with an external shoulder 123. Brass bearing washers 126, 127 respectively are provided between the inner end of dial 97 and the bottom 95 of bore portion 94, and between the knob shoulder 123 and an encircling lock plate 128. By means of locking means 129, the lock plate 128 can be adjusted to valve body 92 to prevent end play while still allowing angular adjustment of dial 97. Plate 128 also contains a finger 131 which projects into a cutout or longitudinal slot 132 in the dial, thereby limiting the extent of angular movement of dial 97. The operating limits of movement of the knob correspond with the operating limits of movement of hanger 66 about trunnions 67, 67.

A pin or key 133 projects into the recess 122 of dial 97, and this key 133 is loosely engaged in the slot 118 of spool 103. A screw stop or cam 135 is threaded into an opening provided in knob recess 122, and this stop 135 has an inner end 136 for engaging the ramp or cam track 117 of spool 103.

A coil spring 137 encircles shaft 110 and is compressed between trunnion 67 at one end and the inner end of spool bore 109, thereby constantly urging cam surface 117 against the end 136 of stop 135. The inner end of bore 93 below spool 103 is connected to the internal chamber 14 of the pump through suitable passages not shown, and through chamber 14 is connected to a fluid tank or reservoir, thereby permitting leakage fluid to drain away.

As shown in FIGURE 4, the port or passage 98 in valve body 92 communicates with passage 87 leading to biasing piston 85, while port or passage 99 is connected to passage 88 which leads to the cylinder of servo operated hanger positioner piston 86. In use, pressure fluid is supplied to line 87 either from the higher pressure side of the pump itself or from a separate source of fluid pressure such as a biasing pump or pilot pump.

In operation, a manually applied rotational input can be supplied to servovalve 91 to adjust the hanger position and thereby regulate the volume of fluid delivered by the pump per unit time. Assuming that pressure fluid is being supplied to line 87 either from the pump itself or from a separate source, rotation of control means 97 will move stop 135 along cam track 117, thereby causing or permitting spool 103 to move inwardly or outwardly depending upon the direction of rotation of the dial.

With reference to FIGURE 3, if knob 103 is turned so that stop 135 moves to the right, then the incremental movement of the dial tends to move it off of cam surface 117. This permits spring 137 to urge the spool axially outwardly so that ramp 117 is maintained in contact with the end of 136 of the stop 135. As spool 103 is moved outwardly in bore 93, a flow path is opened between passage 99 and tank, thereby effectively connecting the piston 86 to tank and creating a pressure drop. Since pressure fluid is constantly supplied through line 87 to biasing piston 85, the force applied by biasing piston 85 to hanger extension 84 exceeds the opposite force applied thereto by piston 86, and the hanger is thereby swung clockwise in FIGURE 4.

This rotational movement of the hanger 66 about its trunnions 67, 67 in response is fed back to spool 103 through connecting plate 114, shaft 110 and key 111. The direction of rotation of the hanger is such as to rotate spool 103 in a direction following the rotation of dial 97. Ordinarily the responsitivity of the servovalve to an input control movement applied to dial 97 is so quick that spool 103 rotates almost with the dial, and pin 133 does not even contact the edges of slot 118.

In following the rotation of knob 97, spool 103 is cammed inwardly in bore 93 by the end of stop 135 as the spool rotates relative to the stop, until the spool has moved sufficiently that land 105 again closes passage 99 just sufficiently to produce the correct pressure behind piston 86 and restore the balanced forces condition.

If the hanger 66 tends to rotate past the control setting of the dial 97, then spool 103 will also rotate past the desired degree of angulation and in so doing will be depressed inwardly an additional amount by the cam action of ramp 117 and the end 136 of stop 135. Hence passage 99 will then tend to be more open to passage 98 than to tank which will increase the pressure behind piston 86. It is evident that by this action a constant self-correcting action or feedback signal is provided.

From the foregoing, those skilled in the art will appreciate that depending upon the degree of sensitivity desired, the permissible fluid leakage and other variables, the width of land 105 can be made just equal to or slightly larger or smaller than the diameter of passage 99.

It can also be appreciated that the fit of key 111 in its keyway is not especially critical because when the hanger is on either side of its centered position a biasing force will act on the hanger, and this force is transmitted through shaft 110 to hold key 111 against the side of its keyway, thereby taking up any play and preventing backlash. This permits use of less critical manufacturing tolerances and also tends to minimize the possibility of binding or sticking of the key in the keyway which might hinder axial movement of spool 103 in bore 93 or on the keyway of shaft 110.

If the rotary control movement imparted to control means 97 is such that stop 135 is moved to the left, as viewed in FIGURE 3, such movement of the stop will cam the spool 103 inwardly. A flow path is thereby established from port 98 and groove 104 to passage 99, and pressure fluid will be supplied from line 98 to piston 86 through line 88. Since the area of the piston 86 exceeds the area of biasing piston 85, the hanger is moved counterclockwise as seen in FIGURE 4. Counterclockwise movement of the hanger is transmitted and reflected as rotation of shaft 110 in a direction tending to move cam surface 117 off stop 135, and spring 137 pushes the spool outward and holds the cam track in contact with stop 136. Rotation of the hanger and shaft 110 will continue until the feedback to spool 103 has rotated the spool to a point at which the spool has been moved axially by spring 137 sufficiently for land 105 again to close passage 99.

As previously suggested, pin 133 ordinarily does not contact either side of slot 118. However, if the pump has been stopped with the hanger in dead center position fluid pressure may not initially be present in line 87 unless a separate biasing pump is used, and hence there will not initially be sufficient fluid pressure to operate the pistons 85 and 86 and swing the hanger off centered position. In these circumstances, initial rotation of the dial 97 will not be followed by rotation of the hanger. The pin 133 will therefore engage one or the other sides of slot 118, depending upon the direction of rotation of dial 97, and a direct mechanical drive between the dial, the spool 103, shaft 110 and the hanger will be established. Once the hanger is displaced slightly off center, fluid pressure will become available to cause the device to continue to follow the rotation of the dial 97.

Pin 133 can be omitted, and its omission provides an advantage in that there can then be no rotary mechanical force transfer of the input command signal to the hanger; the only linkage is hydraulic. This prevents any possibility of damage to the components arising from too much input signal force being applied, for example at a time when system pressure is low and response is slow. Omission of pin 133 also permits the operator to preset a desired hanger position with minimal effort before start-up.

In stable condition stop 135 always engages the cam surface 117 at essentially the same point thereon. The greater the angle through which control means 97 is turned, the greater the angle through which the hanger will turn, within operating limits. Angular movement of the control means 97 is followed by equal angular movement of the hanger. Turning control means 97 through a central or zero position will cause the hanger to swing cross center, thereby changing the direction of flow through the pump. As shown in FIGURE 1, stop 135 is axially adjustable. This permits adjustment of hanger position independently of the setting of dial 97, if desired.

It will be apparent that the positions of the cam surface 117 and stop 136 could be reversed without loss of function; that is, the cam surface could alternatively be provided on the control member 97 and the cam follower 136 be mounted on spool 103. Also, in place of the axial piston pump referred to for purposes of illustration, those skilled in the art will appreciate that the servovalve of this invention can be used to control the volume displacing means of any variable volume pump or motor having volume changing means which are positioned by fluid pressure. If the device being controlled is a fluid motor rather than a fluid pump, then the pressure for operating the servovalve i.e. the source of pressure applied to line 87, will come not from the motor but from the separate pressure source driving the motor, but other than that the operation of the device is similar to that previously described.

Since servovalve 91 is not limited to movements less than 360°, but is responsive to an input of any number of radians within the operating range of the device to which it is connected, it is not limited to use in hanger control. The servovalve can be connected to match the angular position of other hydraulically operated mechanisms to a rotary input signal.

Dial 97 can, if desired, be removed and relocated in an attitude 180° from the position shown in the drawings, so that stop 135 engages the other side of ramp 117. This will reverse operating characteristics, i.e. the hanger will move clockwise for a counterclockwise movement of dial 97. If used, pin 133 should be repositioned for such reversal since otherwise it would no longer engage slot 118.

Having described my invention, I claim:

1. Servomechanism for controlling the angular position of pressure operated rotatable means, said servomechanism comprising,
   a body having a bore,
   a spool movable axially and rotationally in said bore,
   valve means defined by and between said bore and axially symmetrical means on said spool, said valve means being operated by axial movement of said spool for opening a flow path to apply pressure fluid to said rotatable means in response to axial movement of said spool in said bore in one direction from a neutral position therein and for opening a flow path to release fluid pressure on said rotatable means in response to axial movement of said spool in said bore in the opposite direction from said neutral position, said valve means being unresponsive to rotation of said spool without axial movement of said spool,
   movable control means presenting a rotatable cam,
   said spool having a cam surface formed thereon for engaging said cam, said cam surface being such that rotation of said cam relative to said surface tends to cam said spool axially and thereby operate said valve means,
   means yieldably biasing said spool in a direction tending to maintain engagement of said cam surface with said cam,
   and means for rotationally coupling said spool to said rotatable means so that movement of said rotatable means rotates said spool and tends to move said cam surface relative to said cam, said spool being movable axially with respect to said coupling means.

2. The servomechanism of claim 1 wherein said valve means includes a land formed on said spool and a passage in said body for connection to said rotatable means, said passage including a port in said bore, said land forming a closure of said port when said spool is at said neutral position in said bore.

3. The servomechanism of claim 1 wherein said cam surface is a plane extending angularly to the axis of said spool.

4. The servomechanism of claim 1 wherein said coupling means comprises a shaft rotatably connected between said rotatable means and said spool.

5. The servomechanism of claim 4 wherein said biasing means comprises a coil spring coaxial with said spool.

6. Servomechanism for controlling a variable displacement fluid pressure energy translating device having rotatable displacement changing means operated by a piston,
   said servomechanism comprising,
   a body having a bore,
   a spool movable axially in said bore, said spool having an axis of rotation and being rotatable about said axis in said bore,
   normally closed valve means defined by and between said spool and bore, said valve means being operated by axial movement of said spool for opening a flow path to apply pressure fluid to said piston in response to axial movement of said spool in said bore in one direction from a neutral position therein and for opening a flow path to release fluid pressure on said piston in response to axial movement of said spool in said bore in the opposite direction from said neutral position,
   cam means rotatable about said spool,
   said spool having a transverse cam surface formed thereon for engaging said cam means, relative rotational movement between said cam means and cam surface camming said spool axially and thereby operating said valve means,
   biasing means urging said spool in a direction maintaining engagement of said cam surface with said cam means,
   and means for rotationally coupling said spool to said displacement changing means, said spool being movable axially with respect to said coupling means.

7. A valve for controlling a variable displacement fluid pressure energy translating device having rotatable displacement changing means operated by a piston,
   said valve comprising,
   a body having a bore,
   a spool movable axially in said bore, said spool having an axis of rotation and being rotatable about said axis in said bore,
   normally closed valve means defined by and between said spool and bore, said valve means being operated by axial but not rotational movement of said spool for opening a flow path to apply pressure fluid to said piston in response to axial movement of said spool in said bore in one direction from a neutral position therein and for opening a flow path to release fluid pressure on said piston in response to axial movement of said spool in said bore in the opposite direction from said neutral position,
   a rotatable control member rotatable about said spool,
   a cam presented by one of said control member and spool,
   a cam surface presented by the other of said control member and spool for engaging said cam, relative rotational movement between said cam and cam surface camming said spool axially and thereby operating said valve means,
   biasing means urging said spool in a direction maintaining engagement of said cam surface with said cam,
   and means for rotationally coupling said spool to said displacement changing means, said spool being movable axially with respect to said coupling means.

8. The valve of claim 7 wherein said valve means include a land formed on said spool and a passage formed in said body for connection to said piston, passage entering said bore, said land forming a closure of said passage when said spool is at said neutral position in said bore.

9. The valve of claim 7 wherein said cam surface is a surface extending skew to the axis of said spool.

10. The valve of claim 15 wherein said displacement changing means are rotatable about trunnions, and wherein said coupling means comprise a shaft coaxial with said trunnions for connection between said displacement changing means and said spool.

11. A servovalve for controlling the angular position of pressure operated rotatable means,
    said servovalve comprising,
    a valve body presenting a bore having a spool movable therein, said spool having axially symmetrical surface means thereon forming a spool valve with a port entering said bore for controlling the application and release of pressure fluid to said rotatable means by axial movement of said spool relative to said port, said spool valve being unresponsive to rotation of said spool with respect to said valve body,
    rotatable cam means cooperable with said spool to cam said spool axially relative to said port and thereby operate said spool valve,
    means for rotationally connecting said spool to said rotatable means to reflect the angular position of said rotatable means in the angular position of said spool, said connecting means permitting axial movement of said spool relative to it, and means biasing said spool axially toward said cam means.

12. The servovalve of claim 11 wherein said cam means includes a portion loosely engageable with said spool for establishing a rotational drive connection between said cam means and said rotatable means through said spool and connecting means.

13. Servomechanism for controlling the angular position of pressure operated rotatable means, said servomechanism comprising, a body having a bore, a spool movable axially and rotationally in said bore, valve means defined by and between said spool and bore, said valve means being operated by axial movement of said spool for opening a flow path to apply pressure fluid to said rotatable means in response to axial movement of said spool in said bore in one direction from a neutral position therein and for opening a flow path to release fluid pressure on said rotatable means in response to axial movement of said spool in said bore in the opposite direction from said neutral position, movable control means presenting a cam, said control means and cam being rotatable about said spool, said control means having a member loosely extending into an opening provided in said spool for establishing a rotational drive connection between said control means and said spool, said spool having a cam surface formed thereon for engaging said cam, said cam surface being such that movement of said cam relative to said surface tends to cam said spool axially and thereby operate said valve means, means yieldably biasing said spool in a direction tending to maintain engagement of said cam surface with said cam, and means for rotationally coupling said spool to said rotatable means so that movement of said rotatable means rotates spool and tends to move said cam surface relative to said cam, said spool being movable axially with respect to said coupling means.

14. Servomechanism for controlling the angular position of pressure operated rotatable means, said servomechanism comprising, a body having a bore, a spool movable axially and rotationally in said bore, valve means defined by and between said spool and bore, said valve means being operated by axial movement of said spool for opening a flow path to apply pressure fluid to said rotatable means in response to axial movement of said spool in said bore in one direction from a neutral position therein and for opening a flow path to release fluid pressure on said rotatable means in response to axial movement of said spool in said bore in the opposite direction from said neutral position, movable control means presenting a cam, said spool having a cam surface formed thereon for engaging said cam, said cam surface being such that movement of said cam relative to said surface tends to cam said spool axially and thereby operate said valve means, means yieldably biasing said spool in a direction tending to maintain engagement of said cam surface with said cam, and means for rotationally coupling said spool to said rotatable means so that movement of said rotatable means rotates said spool and tends to move said cam surface relative to said cam, said spool being movable axially with respect to said coupling means, said coupling means comprising a shaft rotatably connected between said rotatable means and said spool, said spool being connected to said shaft by means permitting axial movement of said spool relative to said shaft.

15. A valve for controlling a variable displacement fluid pressure energy translating device having rotatable displacement changing means operated by a piston, said valve comprising, a body having a bore, a spool movable axially in said bore, said spool having an axis of rotation and being rotatable about said axis in said bore, normally closed valve means defined by and between said spool and bore, said valve means being operated by axial movement of said spool for opening a flow path to apply pressure fluid to said piston in response to axial movement of said spool in said bore in one direction from a neutral position therein and for opening a flow path to release fluid pressure on said piston in response to axial movement of said spool in said bore in the opposite direction from said neutral position, a rotatable control member, said control member having a portion loosely engageable with said spool for establishing a rotational drive connection between said control member and said spool, a cam presented by one of said control members and spool, a cam surface presented by the other of said control member and spool for engaging said cam, said cam surface extending skew to the axis of said spool, relative rotational movement between said cam and cam surface camming said spool axially and thereby operating said valve means, biasing means urging said spool in a direction maintaining engagement of said cam surface with said cam, and means for rotationally coupling said spool to said displacement changing means, said spool being movable axially with respect to said coupling means.

References Cited

UNITED STATES PATENTS 3,159,084  12/1964  Zeigler et al. _____ 91—368
3,285,141  11/1966  Palmer _____ 91—368
3,292,499  12/1966  Duffy _____ 91—368

PAUL E. MASLOUSKY, *Primary Examiner.*